United States Patent
Aguggiaro et al.

(10) Patent No.: US 10,696,334 B2
(45) Date of Patent: Jun. 30, 2020

(54) WING FOR VEHICLES, PROCESS FOR ITS CONTROL AND MOTOR VEHICLE COMPRISING THIS WING

(71) Applicant: AUTOMOBILI LAMBORGHINI S.P.A., Sant'Agata Bolognese (Bologna) (IT)

(72) Inventors: Andrea Aguggiaro, Padua (IT); Emiliano Dini, Montecatini Terme (IT); Riccardo Parisi, Sant'Agata Bolognese (IT); Antonio Torluccio, Imola (IT)

(73) Assignee: AUTOMOBILI LAMBORGHINI S.P.A., Sant'Agata Bolognese (IT)

( * ) Notice: Subject to any disclaimer, the term of this patent is extended or adjusted under 35 U.S.C. 154(b) by 136 days.

(21) Appl. No.: 15/775,210

(22) PCT Filed: Dec. 16, 2016

(86) PCT No.: PCT/IB2016/057705
§ 371 (c)(1),
(2) Date: May 10, 2018

(87) PCT Pub. No.: WO2017/103870
PCT Pub. Date: Jun. 22, 2017

(65) Prior Publication Data
US 2018/0354564 A1 Dec. 13, 2018

(30) Foreign Application Priority Data
Dec. 16, 2015 (IT) .................. 102015000084040

(51) Int. Cl.
*B62D 35/02* (2006.01)
*B62D 35/00* (2006.01)
*B60K 11/08* (2006.01)

(52) U.S. Cl.
CPC .......... *B62D 35/00* (2013.01); *B62D 35/02* (2013.01); *B60K 11/08* (2013.01); *Y02T 10/82* (2013.01); *Y02T 10/88* (2013.01)

(58) Field of Classification Search
CPC ........ B62D 35/00; B62D 35/02; Y60K 10/82; Y60K 10/88; B60K 11/08; Y02T 50/14;
(Continued)

(56) References Cited

U.S. PATENT DOCUMENTS 5,435,193 A * 7/1995 Halliday ............... B60T 8/172
73/862.541
5,821,434 A * 10/1998 Halliday ............... B60G 7/008
73/862.541

(Continued)

FOREIGN PATENT DOCUMENTS

CN 104875795 A 9/2015
DE 2726507 A1 12/1978
(Continued)

OTHER PUBLICATIONS

Saeed et al., A review on the platform design, dynamic modeling and control of hybrid UAVs, 2015, IEEE, p. 806-815 (Year: 2015).*
(Continued)

*Primary Examiner* — Mcdieunel Marc
(74) *Attorney, Agent, or Firm* — Shuttleworth & Ingersoll, PLC; Timothy J. Klima

(57) ABSTRACT

Wing including an upper surface predominantly concave upwards and a lower surface predominantly convex downwards, which wing is provided with one or more supports to be fixed to a vehicle, in which the lower surface of the wing is provided with one or more slits that connect with the outside one or more first ducts arranged in the wing, which are in turn connected to at least one second duct arranged in at least one support, wherein at least one valve connected to
(Continued)

at least one actuator is arranged along the second duct or along a third duct connected to this second duct. A process for controlling the operation of the wing and a motor vehicle includes this wing.

23 Claims, 4 Drawing Sheets

(58) Field of Classification Search
CPC .......... B60G 2200/144; B60G 2300/27; B60G 2200/46; B60G 2202/40; B60T 2240/02
See application file for complete search history.

(56) References Cited

U.S. PATENT DOCUMENTS

| | | | |
|---|---|---|---|
| 9,381,957 B1* | 7/2016 | Auden ................. | B62D 35/007 |
| 2003/0085319 A1* | 5/2003 | Wagner .................... | B64C 3/56 |
| | | | 244/12.3 |

FOREIGN PATENT DOCUMENTS

| | | |
|---|---|---|
| EP | 1071868 B1 | 8/2002 |
| WO | WO8809737 A1 | 12/1988 |
| WO | 9818668 A1 | 5/1998 |
| WO | WO9951861 A2 | 10/1999 |
| WO | WO0131176 A1 | 5/2001 |

OTHER PUBLICATIONS

Kanistras et al., Development of a Circulation Control Wing for UAVs, 2014, IEEE, p. 1-8 (Year: 2014).*
James, Winning formula, 2006, IEEE, p. 1-5 (Year: 2006).*
Wang et al., Investigation of 2004 Ferrari Formula One race car wing effects, 2010, IEEE, p. 85-88 (Year: 2004).*
Ipilakyaa et al., Computational Fluid Dynamics Modelling of an Aerodynamic Rear Spoiler on Cars, 2018, Internet, p. 1-6 (Year: 2018).*
International Search Report and Written Opinion dated Mar. 8, 2017 from counterpart PCT App No. PCT/IB2016/057705.
Chinese Office Action dated Mar. 3, 2020 from counterpart Chinese App 201680073667.1.

* cited by examiner

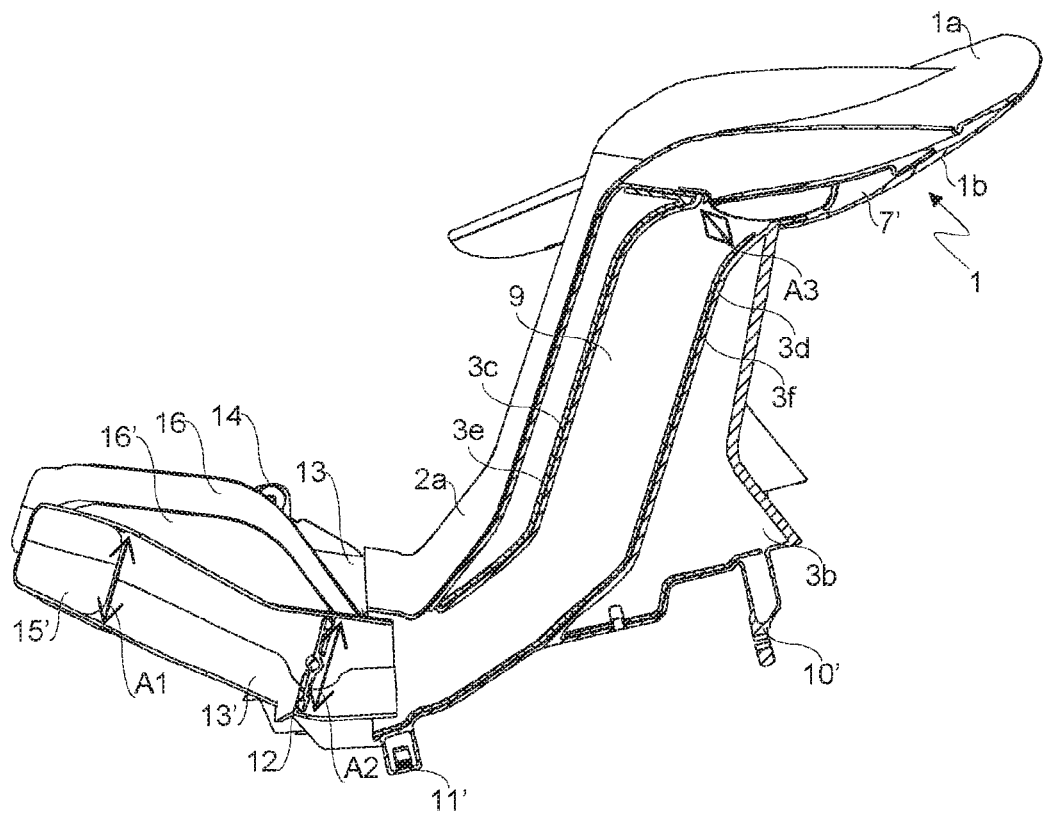
Fig. 9
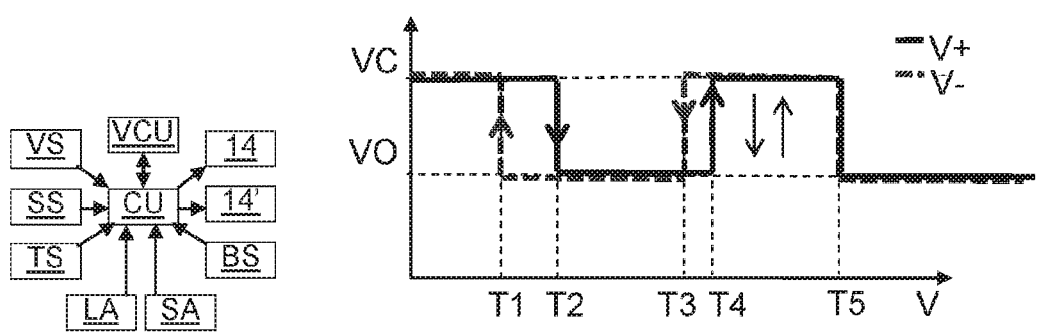
Fig. 10
Fig. 11

WING FOR VEHICLES, PROCESS FOR ITS CONTROL AND MOTOR VEHICLE COMPRISING THIS WING

This application is the National Phase of International Application PCT/IB2016/057705 filed Dec. 16, 2016 which designated the U.S.

This application claims priority to Italian Patent Application No. 102015000084040 filed Dec. 16, 2015, which application is incorporated by reference herein.

TECHNICAL FIELD

The present invention relates to a wing for vehicles and in particular a wing which can be mounted on a motor vehicle to generate a downward thrust and to increase its adherence to the ground. The present invention also relates to a process for controlling the operation of the wing and a motor vehicle comprising this wing.

BACKGROUND OF THE INVENTION

The lower surface of a known wing for vehicles, used especially in sports cars, in particular for Formula 1 competitions, is provided with one or more slits which connect ducts arranged in the wing with the outside. The ducts in the wing are connected to an external duct which is arranged in front of the wing and is connected in turn to an air intake arranged in front of the driving seat of the motor vehicle. In this way the pilot, by manually closing the air flow that passes through said external duct, can let air pass through the slits to reduce the aerodynamic drag of the wing and its downward thrust.

Said known wing is relatively heavy, complex and difficult to manufacture, install, operate and maintain. Furthermore, the external duct and the air intake worsen the aerodynamics and the aesthetics of the vehicle.

DE 2726507 A1 describes a wing with a lower surface provided with an opening that connects with the outside ducts arranged in the wing and in the supports that support it. These ducts are directly connected to a pressure generator in a vehicle.

SUMMARY OF THE INVENTION

The object of the present invention is therefore to provide a wing free from said drawbacks. Said object is achieved with a wing and a process whose main features are specified in the attached claims.

Thanks to the special ducts inserted in the supports, the wing may have more compact dimensions and better aesthetics than the known wings.

Thanks to the particular ducts arranged at the free ends of the supports, the wing can integrate not only a valve and its actuator but also an air intake and an air exhaust, so as to reduce the overall size and/or exploit the air inlets and the airflow used to cool the engine.

Thanks to the particular throttle valve and the actuator arranged beside it, the weight of the air flow control system and the number of moving components can be minimized.

Thanks to the particular sizes, shapes and arrangements of the wings, of the supports and of the slits, the aerodynamics can be optimized to improve the effectiveness of the effect due to the passage of air through the slits.

Thanks to the particular electronic control system of the actuators, the operation of the wing can be automatically controlled in real time and adjusted manually or automatically to the different conditions of use of the vehicle, especially if a particular control procedure is used that exploits the parameters of the vehicle detected by suitable sensors.

The weights, the assembly time and the risk of faults of the wing and of the supports can be reduced by employing particular shell structures with internal ribs that can be joined together by means of adhesives.

The downward thrust acting on the two sides of the vehicle can advantageously be differentiated by using at least two supports that have ducts independent from each other and are arranged at particular positions along the wing, preferably not at its ends.

BRIEF DESCRIPTION OF THE DRAWINGS

Further advantages and features of the present invention will be apparent to those skilled in the art from the following detailed and non-limiting description of an embodiment thereof with reference to the accompanying drawings in which:

FIGS. 7, 8, 9 respectively show enlarged sections VII-VII, VIII-VIII and IX-IX of FIG. 6;
FIG. 10 shows a scheme of the control system of the wing of FIG. 1;
FIG. 11 shows a graph of the operation of the wing of FIG. 1 during use.

EXPLANATORY EMBODIMENTS OF THE INVENTION

Figure 1:
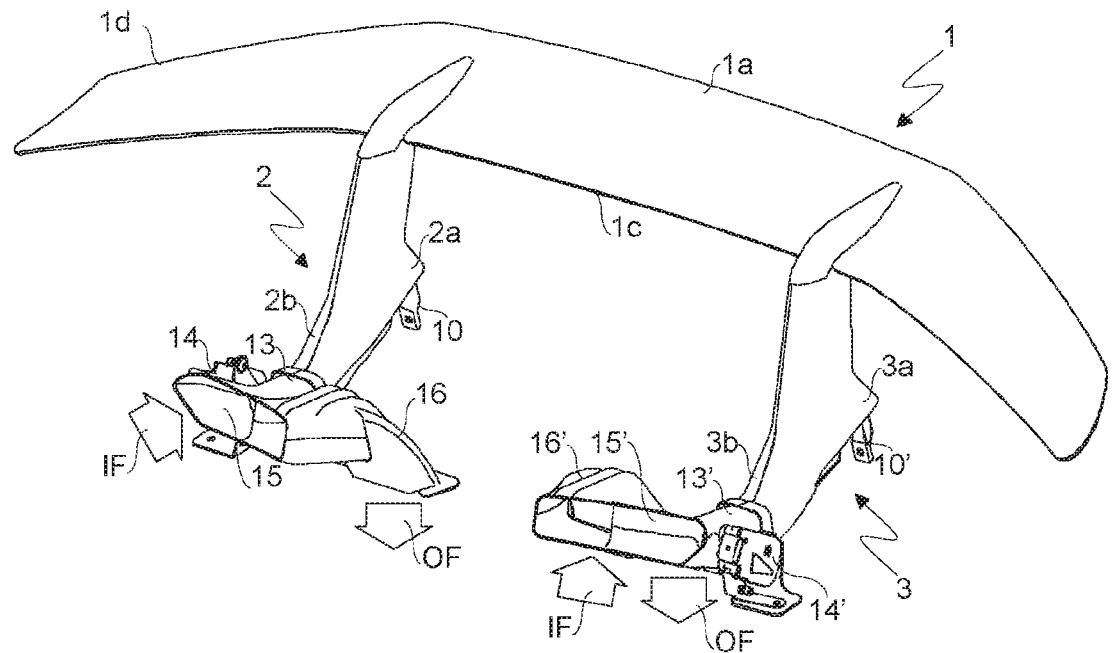
FIG. 1 shows an axonometric view of the wing.
Figure 2:
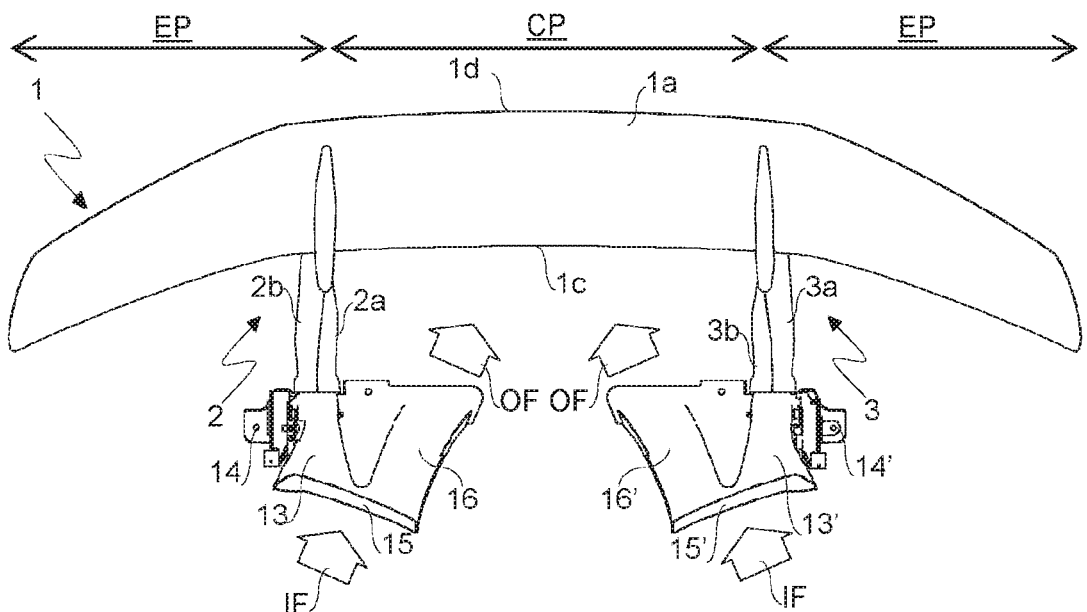
FIG. 2 shows a top view of the wing of FIG. 1.
Figure 3:
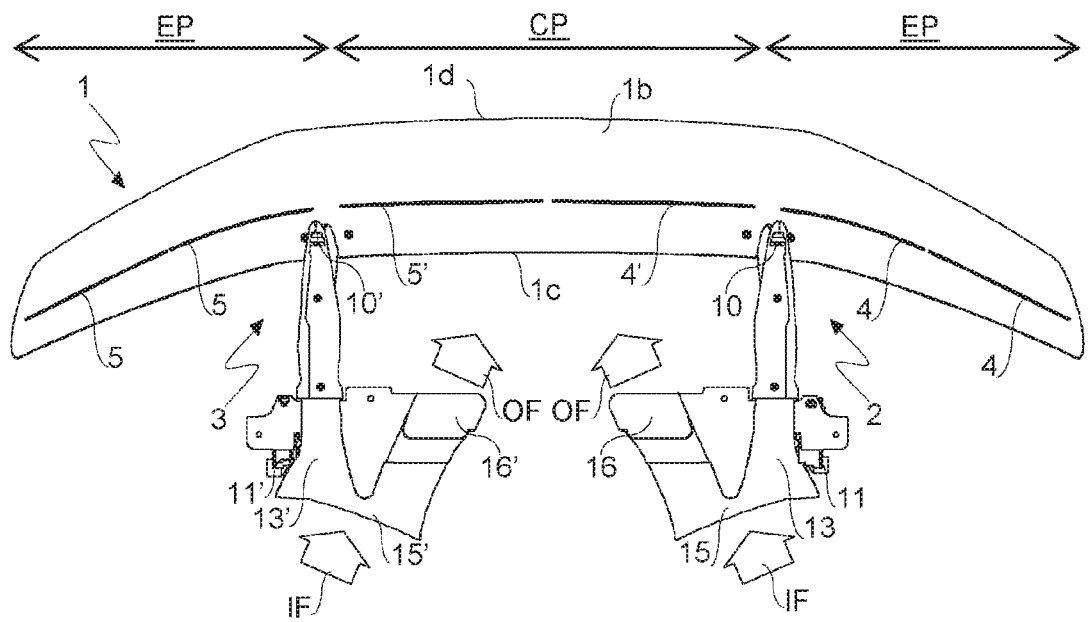
FIG. 3 shows a bottom view of the wing of FIG. 1.
Figure 4:
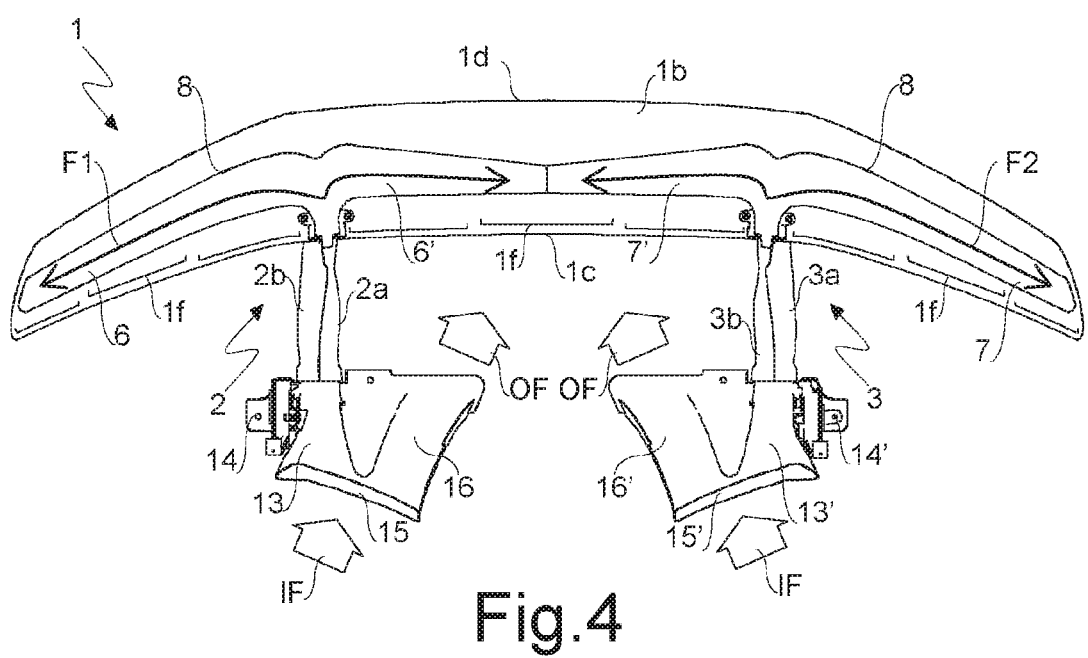
FIG. 4 shows the wing of FIG. 2 without the upper shell.
Figure 5:
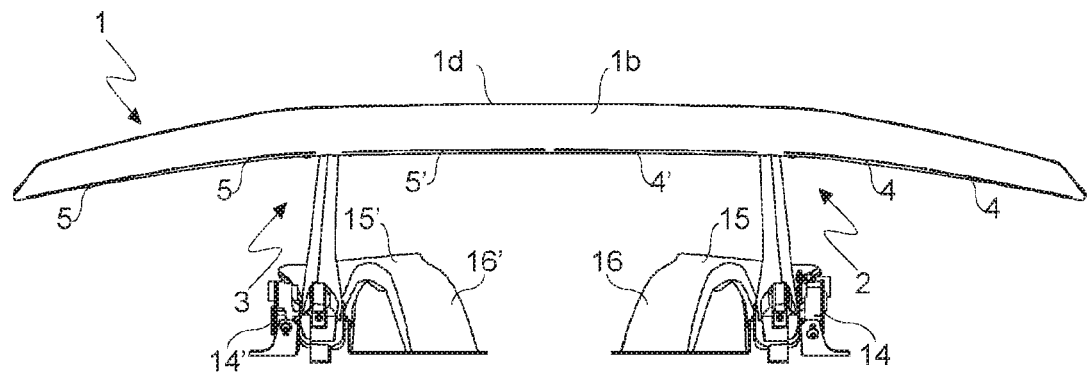
FIG. 5 shows a rear view of the wing of FIG. 1.
Figure 6:
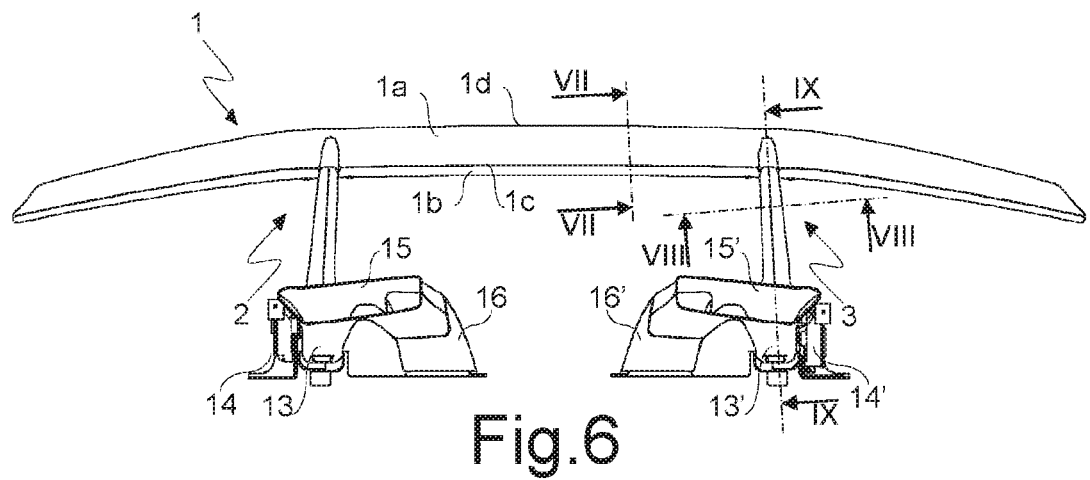
FIG. 6 shows a front view of the wing of FIG. 1.

Referring to FIGS. 1 to 7, it is seen that the wing 1 according to the present invention comprises an upper surface 1a predominantly concave upwards and a lower surface 1b predominantly convex downwards so as to generate a downward thrust if the wing 1 is moved forwards, in particular if it mounted on a vehicle (not shown in the figures), for example of a sports car, in motion. The wing 1 is provided with one or more supports, preferably at least two supports 2, 3, to fix the wing 1 to said vehicle, in particular on its rear portion. The supports 2, 3 may protrude below the lower surface 1b of the wing and preferably have a shape similar to a fin of an airplane. The front edge 1c of the wing 1 is concave forwards and/or the rear edge 1d of the wing 1 is convex rearwards. The wing 1 has preferably a central portion CP comprised between the supports 2, 3 and between two outer portions EP having a width between 60% and 90%, in particular between 70% and 80%, of the width of the central portion CP. The wing 1 includes an upper shell that comprises the upper surface 1a and is joined, in particular glued, to a lower shell which comprises the lower surface 1b. To facilitate such a joining, the upper shell may comprise at least one first longitudinal rib 1e, namely a rib that extends along the wing 1, which projects downwards, and be joined to at least one second longitudinal rib 1f which protrudes upwards from the lower shell. Said one or more supports 2, 3 may comprise a left shell 2a, 3a joined, preferably glued, to a right shell 2b, 3b.

The lower surface 1b of the wing 1 is provided with one or more slits 4, 4',5, 5' which connect with the outside one or more first ducts 6, 6',7, 7' arranged in the wing 1. The slits 4, 4',5, 5' substantially follow the same profile of the portion adjacent to them of the front edge 1c of the wing 1.

One or more first slits 4, 4' arranged on one side of the wing 1 are connected to one or more first ducts 6, 6', and one or more second slits 5, 5' arranged on the opposite side of the wing 1 are connected to one or more further first ducts 7, 7', so that said first slits 4, 4' and second slits 5, 5' are connected respectively to at least two first ducts 6, 6' and 7, 7' to take at least two independent airflows F1 and F2 toward the slits 4, 4',5, 5'.

In particular, one or more slits 4, 5 are arranged in each outer portion EP of the wing 1 and one or more slits 4',5' are arranged in the central portion CP of the wing 1. At least one slit 4 or 5 of an external portion EP of the wing 1 and/or at least one slit 4 or 5' of the central portion CP are connected respectively to two first ducts 6, 6' or 7, 7', in particular two of four first ducts 6, 6' or 7, 7', which depart from a support 2 or 3. The ducts 6, 6',7, 7' can be defined by one or more channels 8 which have a substantially U-shaped cross-section, are open towards the slits 4, 4',5, 5' and are joined to the lower shell of the wing 1. The width of the slits 4, 4',5, 5' is comprised between 0.5 and 40 mm, in particular between 2 and 4 mm. The distance D of the slits 4, 4',5, 5' from the front edge 1c of the wing 1, taken on the projection of the chord C of the wing 1, is between 5% and 70%, in particular between 30% and 40%, of the chord C.

The first ducts 6, 6' or 7, 7' are connected to at least one second duct 9 arranged in at least one of said supports 2 and/or 3. In particular, the first ducts 6, 6' which depart from the first support 2 are connected to a second duct (not visible in the figures) arranged in the first support 2 and the first ducts 7, 7' that depart from the second support 3 are connected to a second duct 9 arranged in the second support 3. Therefore, at least two first ducts 6, 6',7, 7' can be connected respectively to at least two second ducts 9 arranged respectively in at least two supports 2, 3.

The free end, namely the base, of each support 2 and/or 3 can be provided with one or more perforated pins 10, 10' and/or 11, 11' that protrude downwards and can be inserted into corresponding seats formed in the upper portion of a vehicle to fix the wing 1 thereto.

Figures 7, 8:
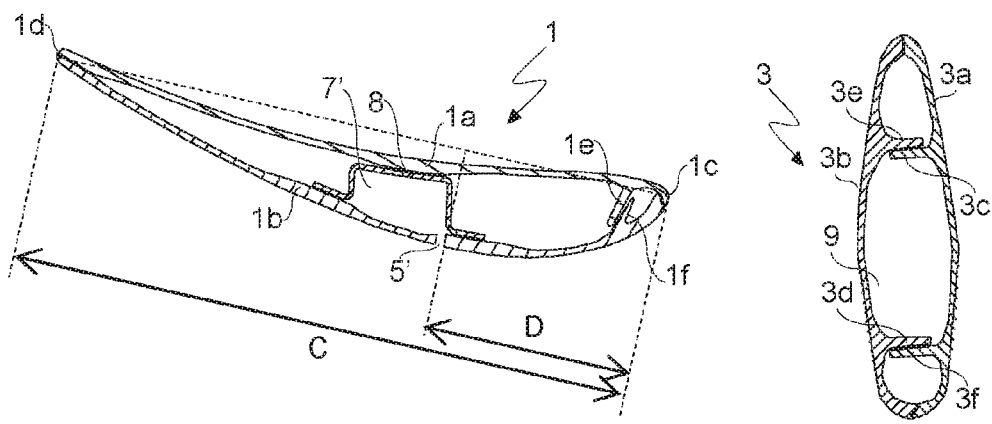

Referring also to FIG. 8, it is seen that each second duct 9 in the support 2 and/or 3 is preferably defined not only by the internal walls of the left shell 3a and right shell 3b of the support 3 but also by one or more longitudinal ribs 3c, 3d, namely ribs which extend along the support 3, which protrude inwardly from one of the inner walls of the left shell 3a or right shell 3b and which are in particular joined two by two to further longitudinal ribs 3e, 3f which protrude inward from the opposite inner wall of the right shell 3b or left shell 3a, respectively.

Referring also to FIG. 9, it is seen that at least one valve 12 is arranged along the second duct 9 in the supports 2 and/or 3, or along at least one third duct 13, 13' connected to this second duct 9, so as to adjust an input flow IF that passes through the third duct 13, 13', if present, the second duct 9, one or more first ducts 6, 6',7, 7' and one or more slits 4, 4',5, 5', to mouth under the wing 1. In particular, one or more valves 12 are arranged along a third duct 13 and/or 13' arranged in front of the free end of the second duct 9 at the free end of the supports 2 and/or 3. The valve 12 is preferably a throttle valve having a throttle which can rotate about a substantially horizontal axis. The valve 12 is connected to an actuator 14, 14', in particular an electromechanical actuator arranged beside the third duct 13, 13', to close or open, completely or partially, the way of said input flow IF towards the slits 4, 4',5, 5'. The third duct 13, 13' is provided with an air intake 15, 15' suitable to be connected with the outside, for example through a duct provided with an air intake formed on a portion of the vehicle body, in particular the same air intake used for cooling the engine of the vehicle, so as to obtain an input flow IF that increases with the speed of the vehicle.

The air intake 15, 15' is preferably also connected to an air exhaust 16, 16' suitable to deviate the input flow IF that does not pass in the third duct 13, 13' in an output flow OF, for example directed towards the engine of the vehicle. The third duct 13, 13', the air intake 15, 15' and the air exhaust 16, 16' are preferably obtained by means of pairs of complementary channels formed in two complementary shells which are joined together. In an alternative embodiment, the valve 12 can also be arranged along an air exhaust 16, 16', which is however always a duct connected to the second duct 9.

The area A1 of the cross-section at the beginning of the third duct 13, 13', namely from where it separates from the air exhaust 16, 16', is between 5000 and 7000 mm$^2$, or between 10% and 1000% of the area A2 of the cross-section of the third duct 13, 13' where the valve 12 is placed, which area A2 is between 1500 and 2500 mm$^2$. The area A3 of the cross-section at the end of the second duct 9, namely where it divides into the first ducts 6, 6',7, 7', is comprised between 700 and 800 mm$^2$, or between 10% and 1000% of the area A2. The total area of the slits 4, 4',5, 5' is comprised between 1500 and 2500 mm$^2$, or between 10% and 1000% of the area A2.

Referring to FIG. 10, it is seen that the actuators 14, 14' are connected by wire and/or via radio to at least one electronic control unit CU, which is suitable to control the operation of the actuators 14, 14' to open or close automatically or manually the valves 12, so as to control the downward thrust generated by the wing 1 and its aerodynamic resistance. The control unit CU is in turn connected to a brake sensor BS to detect the position of the vehicle brakes and/or to a speed sensor VS to detect the vehicle speed and/or to a longitudinal accelerometer LA to detect the longitudinal acceleration of the vehicle and/or to a lateral accelerometer SA to detect the lateral acceleration of the vehicle and/or to a throttle sensor TS to detect the position of the vehicle accelerator and/or to a steering sensor SS to detect the position of the vehicle steering, so as to actuate, by means of the actuators 14, 14', one or more valves 12, also with different positions between them, depending on the signals transmitted by these sensors BS, VS, LA, SA, TS and/or SS.

In addition or as an alternative to the connection with these sensors, the control unit CU can be connected with a mono- or bi-directional connection to one or more of vehicle control units VCU, for example by means of a CAN bus or LIN bus connection. The control unit CU may also be integrated in the vehicle control unit VCU. An inertial platform already present in the vehicle for other purposes may also be employed as longitudinal accelerometer LA and/or lateral accelerometer SA.

Referring to FIG. 11, it is seen that in the control process of the wing 1 the control unit CU, according to the speed V of the vehicle detected by the speed sensor VS, can actuate the actuators 14, 14' to open or close the valves 12 at certain speed thresholds T1, T2, T3, T4 and/or T5.

In particular, the valves 12 are in a closed position VC at a speed V below a first threshold T1 and/or in an open position VO at a speed V comprised between a second threshold T2 and a third threshold T3 and/or in the closed position VC at a speed V comprised between a fourth threshold T4 and a fifth threshold T5 and/or in the open position VO at a speed V higher than the fifth threshold T5.

Moreover, in the control process, the control unit CU can close the valves 12 when the speed V decreases (speed V−) below the first threshold T1 and open the valves 12 when the V speed increases (speed V+) above the second threshold T2, which is greater than or equal to the first threshold T1. The control unit CU can also open the valves 12 when the speed V decreases (speed V−) below the third threshold T3 and close the valves 12 when the speed V increases (speed V+) above the fourth threshold T4, which is greater than or equal to the third threshold T3.

The control unit CU can open or close the valves 12 also as a function of the signals received from the longitudinal accelerometer LA and/or from the lateral accelerometer SA and/or from the brake sensor BS and/or from the throttle sensor TS and/or from the steering sensor SS, in particular when the speed V is higher than the fourth threshold T4 and/or lower than the fifth threshold T5. The fifth threshold T5 may also have no effect, namely be higher than the maximum speed of the vehicle.

The control unit CU can close the valves 12 when the brake position measured by the brake sensor BS is higher than a threshold and/or when the longitudinal acceleration measured by the longitudinal accelerometer LA is lower than a threshold, preferably a threshold lower than 0 g indicating a braking condition of the vehicle, so as to reduce the braking distance of the vehicle.

The control unit CU can also close the valves 12 when the steering position measured by the steering sensor SS is higher than a threshold and/or when the absolute value of the lateral acceleration measured by the lateral accelerometer SA is higher than a threshold, so as to improve the cornering grip of the vehicle.

The control unit CU can also open or close in a different manner two or more valves 12 in the second ducts 9 or in third ducts 13, 13' of the supports 2, 3 as a function of the signals received from the lateral accelerometer SA and/or from the steering sensor SS, so that the downward thrust transmitted by one side of the wing 1 through the first support 2 is higher or lower than the downward thrust transmitted by the other side of the wing 1 through the second support 3.

In particular, when the lateral accelerometer SA and/or the steering sensor SS measure a turn to the left of the vehicle, namely when the lateral acceleration is higher than or lower than a threshold and/or the steering position is higher than or lower than a threshold, the control unit CU closes one or more valves 12 to the left of the wing 1, thereby keeping open one or more valves 12 to the right of the wing 1, and vice versa when the vehicle makes a turn to the right, so as to reduce roll of the vehicle caused by the turn.

The first threshold T1 and the second threshold T2 are between 30 and 60 km/h. The third threshold T3 and fourth T4 threshold are between 70 and 90 km/h, while the fifth threshold is greater than 80 km/h.

Possible variants and/or additions may be made by those skilled in the art to the embodiment of the invention here described and illustrated while remaining within the scope of the following claims. In particular, further embodiments may include the technical features of one of the following claims with the addition of one or more technical features, taken individually or in any mutual combination, described in the text and/or illustrated in the drawings.

The invention claimed is:

1. A wing comprising:
    an upper surface predominantly concave upwards and a lower surface predominantly convex downwards,
    one or more supports to be fixed to a vehicle,
    one or more first ducts arranged in the wing,
    the lower surface of the wing including one or more slits that connect an exterior of the wing with the one or more first ducts,
    at least one second duct arranged in at least one of the one or more supports,
    the one or more first ducts being connected to the at least one second duct,
    a third duct connected to the at least one second duct,
    the third duct including an air intake connected also to an air exhaust,
    at least one valve arranged along the at least one second duct or along the third duct and configured for altering a flow through the at least one second duct or the third duct,
    at least one actuator connected to the at least one valve and configured for actuating the at least one valve.

2. The wing according to claim 1, wherein the at least one valve is arranged along the third duct.

3. The wing according to claim 1, wherein the third duct is arranged in front of athe free end of the at least one second duct at a free end of the at least one of the one or more supports.

4. The wing according to claim 1, wherein the valve is a throttle valve having a throttle which is rotatable around a predominately horizontal axis.

5. The wing according to claim 1, wherein the actuator is an electromechanical actuator arranged beside the third duct.

6. The wing according to claim 1, wherein a front edge of the wing is concave forwards, a rear edge of the wing is convex rearwards and the one or more slits follow a same profile as a front edge of the wing.

7. The wing according to claim 1, and further comprising:
    an upper shell that comprises the upper surface,
    a lower shell that comprises the lower surface, the upper shell being joined to the lower shell,
    the upper shell comprising at least one first longitudinal rib which projects downwards,
    the lower shell comprising at least one second longitudinal rib which projects upwards, the at least one first longitudinal rib being joined to the at least one second longitudinal rib.

8. The wing according to claim 1, wherein the one or more slits includes one or more first slits arranged on a side of the wing and one or more second slits arranged on an opposite side of the wing, and the one or more first ducts include two first ducts, with the one or more first slits connected to one of the two first ducts and the one or more second slits connected to the other of the two first ducts.

9. The wing according to claim 8, wherein the one or more supports includes two supports, the at least one second duct includes two second ducts arranged respectively in the two supports and the two first ducts are connected respectively to two second ducts.

10. The wing according to claim 1, wherein at least one of the one or more supports comprises a left shell joined to a right shell, each including an internal wall, and further comprising one or more longitudinal ribs projecting inwardly from at least one of the internal walls, wherein the at least one second duct is defined by the internal wallas and by the one or more longitudinal ribs.

11. The wing according to claim 10, and further comprising one or more further longitudinal ribs projecting inwardly from an opposite one of the least one of the internal walls, wherein the one or more longitudinal ribs are joined two by two to one or more further longitudinal ribs respectively.

12. The wing according to claim 1, and further comprising an at least one electronic control unit, wherein the actuator is operatively connected to the at least one electronic control unit and is also operatively connected to at least one chosen from a group including:
   a brake sensor,
   a speed sensor,
   a longitudinal accelerometer,
   a lateral accelerometer,
   a throttle sensor, and
   a steering sensor,
   to open or close the at least one valve according to at least one signal received from the group.

13. The wing according to claim 1, and further comprising a further third duct, wherein the one or more slits includes two slits arranged respectively on each side of the wind, the at least one second duct includes two second ducts, the at least one valve includes first and second valves which are arranged along the two second ducts or the third or further third ducts connected to the two slits, so that if the first valve is open or closed in a different way from the second valve, downwards thrust transmitted by one side of the wind is higher or lower than the downwards thrust transmitted by one side of the wing is higher or lower than the downwards thrust transmitted by the other side of the wing.

14. A motor vehicle, comprising the wing according to claim 1.

15. The wing according to claim 1, wherein the one or more supports includes two supports, and further comprising a central portion and two outer protions, the central portion positioned between the two supports and between the two outer portions, wherein one or more of the one or more slits are arranged in each outer portion of the wing and one or more of the one or more slits are arranged in the central portion of the wing.

16. The wing according to claim 15, wherein the one or more first ducts includes four first ducts, wherein at least one slit of the one or more slits positioned in one of the two outer portions and at least one slit of the one or more slits positioned in the central portion are connected respectively to two of the four first ducts.

17. A process for controlling a wing, comprising:
   providing a wing mounted on a vehicle, the wing including:
      an upper surface predominantly concave upwards and a lower surface predominantly convex downwards,
      one or more supports fixed to the vehicle,
      one or more first ducts arrange in the wing,
      the lower surface of the wing including one or more slits that connect an exterior of the wing with the one or more first ducts,
      at least one second duct arranged in at least one of the one or more supports,
      the one or more first ducts being connected to the at least one second duct,
      a third duct connected to the at least one second duct,
      the third duct including an air intake connected also to an air exhaust,
      at least one valve arranged along the at least one second duct or along the third duct and configured for altering a flow through the at least one second duct or the third duct,
      at least one actuator connected to the at least one valve and configured for actuating the at least one valve,
   measuring a speed of the vehicle,
   actuating the at least one actuator to close or open the at least one valve according to the speed.

18. The process according to claim 17, and further comprising closing or opening the at least one valve when the speed decreases below a first threshold and opening or closing the at least one valve when the speed increases above a second threshold, which is higher than the first threshold.

19. The process according to claim 17, and further comprising measuring a position of a vehicle brake and closing the at least one valve when the position is higher than a brake position threshold.

20. The process according to claim 17, and further comprising measuring a longitudinal acceleration of the vehicle and closing the at least one valve when the longitudinal acceleration is lower than a longitudinal acceleration threshold.

21. The process according to claim 17, and further comprising measuring a lateral acceleration of the vehicle and closing the at least one valve when an absolute value of the lateral acceleration is higher than a first lateral acceleration threshold.

22. The process according to claim 17, wherein the at least one valve includes a first valve and a second valve, and further comprising measuring a lateral acceleration of the vehicle and closing the first valve and opening the second valve when the lateral acceleration is higher or lower than a second lateral acceleration threshold.

23. The process according to claim 17, wherein the at least one valve includes a first valve and a second valve, and further comprising measuring a position of the vehicle steering and closing the first valve and opening the second valve when the position is higher or lower than a vehicle steering threshold.

* * * * *